United States Patent
Yamauchi (10) Patent No.: US 8,169,524 B2
(45) Date of Patent: May 1, 2012

(54) IMAGE SENSING APPARATUS WITH PIXEL READOUT CORRECTION

(75) Inventor: Makiko Yamauchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 399 days.

(21) Appl. No.: 12/540,807

(22) Filed: Aug. 13, 2009

(65) Prior Publication Data

US 2010/0060753 A1 Mar. 11, 2010

(30) Foreign Application Priority Data

Sep. 8, 2008 (JP) ................................. 2008-230198

(51) Int. Cl.
*H04N 3/14* (2006.01)
*H01L 27/00* (2006.01)
(52) U.S. Cl. ...... 348/308; 348/294; 348/310; 250/208.1
(58) Field of Classification Search .................. 348/243, 348/308–310
See application file for complete search history.

(56) References Cited

U.S. PATENT DOCUMENTS

| | | | | |
|---|---|---|---|---|
| 6,538,693 | B1* | 3/2003 | Kozuka | 348/241 |
| 7,432,493 | B2* | 10/2008 | Koseki | 250/214 A |
| 7,567,281 | B2* | 7/2009 | Yamaguchi et al. | 348/308 |
| 7,889,247 | B2* | 2/2011 | Oike | 348/241 |
| 7,948,533 | B2* | 5/2011 | Koseki | 348/243 |
| 8,040,405 | B2* | 10/2011 | Aoki et al. | 348/245 |
| 2009/0009619 | A1* | 1/2009 | Takeda | 348/222.1 |

FOREIGN PATENT DOCUMENTS

JP 2001-045375 2/2001

* cited by examiner

*Primary Examiner* — Ngoc-Yen Vu
(74) *Attorney, Agent, or Firm* — Cowan, Liebowitz & Latman, P.C.

(57) ABSTRACT

An image sensing apparatus comprises: a pixel array; a plurality of column signal lines; a readout unit; a driving unit that, in a transferring period for the readout unit to transfer pixel signals of columns in a first row to the output line, supplies to the pixel array and/or the readout unit a driving pulse for reading out the pixel signals from a second row, in a transferring period for the readout unit to transfer the pixel signals of the columns in the first row to the output line; and a correction unit that corrects a pixel signal of a first column in the first row that was transferred by the readout unit at a timing at which a level of the driving pulse transitions in the transferring period, according to at least a level of a pixel signal of the first column in the second row.

7 Claims, 8 Drawing Sheets

FIG. 8A (PRIOR ART) — IMAGE SIGNAL COMPONENT, NORMAL READOUT

FIG. 8B (PRIOR ART) — PIXEL SIGNALS

FIG. 8C (PRIOR ART) — SHADING COMPONENT

FIG. 8D (PRIOR ART) — SHADING CORRECTION DATA

FIG. 9 *(PRIOR ART)*

IMAGE SENSING APPARATUS WITH PIXEL READOUT CORRECTION

BACKGROUND OF THE INVENTION

1. Field of the Invention

The present invention relates to an image sensing apparatus.

2. Description of the Related Art

There are conventional image sensing apparatuses such as digital cameras and digital video cameras that use a CCD image sensor or a CMOS image sensor as an image sensor. An image sensor is provided with a pixel array in which a plurality of pixels are arrayed in a direction along a row and in a direction along a column, a readout circuit that reads out signals from the pixel array via a plurality of column signal lines, and an output amplifier that outputs signals received via an output line from the readout circuit. With this image sensor, a gentle variation in the reference level of pixel signals (hereinafter, called "dark shading") according to pixel position may arise, according to differences in the lengths of the column signal lines or output lines for each pixel signal. This dark shading can be corrected using signals output from pixels that are in a shaded state. This correction process is called dark shading correction.

The dark shading correction process is described in detail, using FIGS. 8A to 8D. In FIGS. 8A to 8D, the vertical axis shows the signal level, and the horizontal axis shows the position of the readout pixel in a direction along a column in the selected row.

Figure 8A:
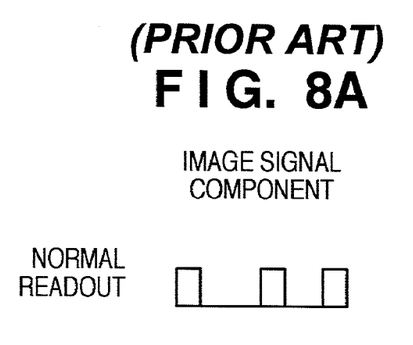
FIGS. 8A to 8D are for illustrating the background art.
Figure 8B:
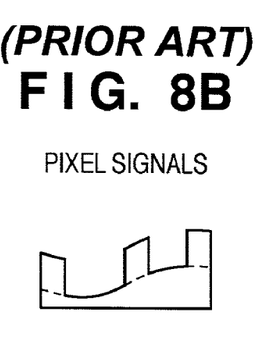
Figure 8C:
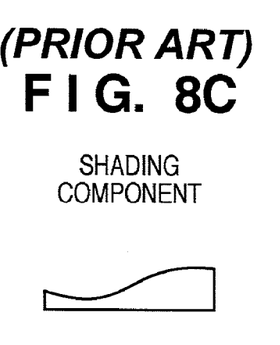
Figure 8D:
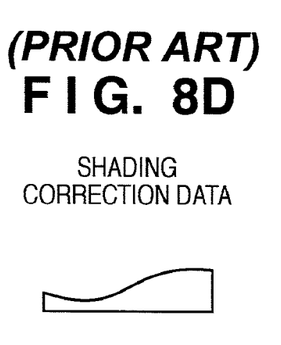

Pixel signals of the levels shown in FIG. 8A that are output from the pixels to the column signal lines are also affected by the dark shading shown in FIG. 8C in the process of being transferred by the column signal lines and the output lines. The pixel signals sequentially received by the output amplifier via the output lines are, as shown in FIG. 8B, a signal obtaining by superimposing the dark shading component shown in FIG. 8C on the image signal component shown in FIG. 8A.

Figure 9:
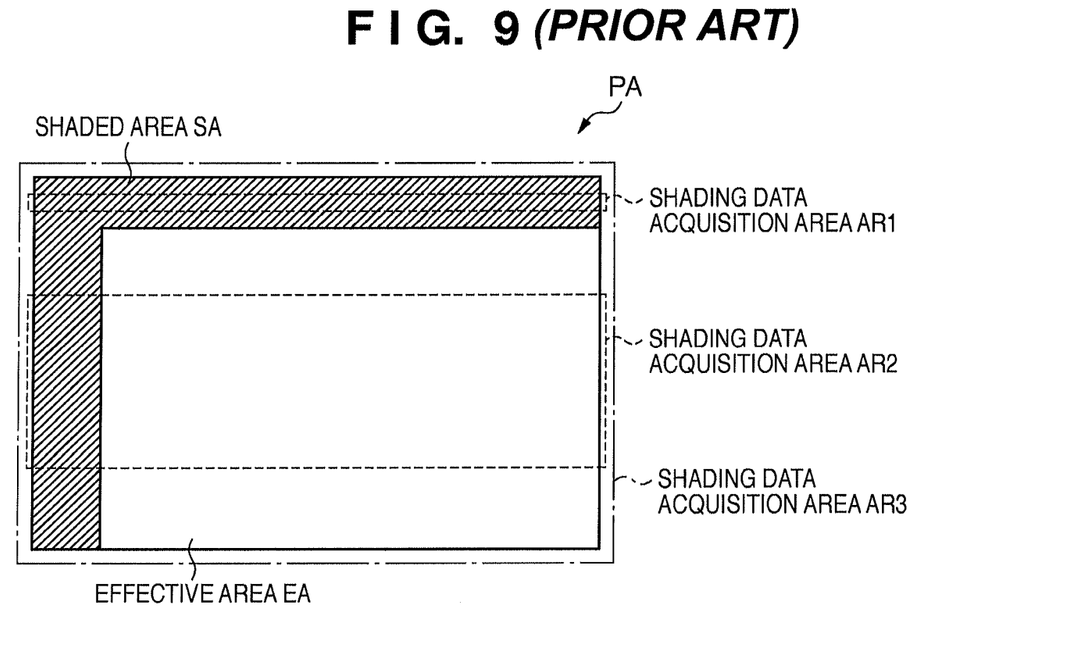
FIG. 9 is for illustrating the background art.

Here, as shown in FIG. 9, the readout circuit reads out black level reference signals from pixels in an entire pixel area AR3 or a partial area AR2 of a pixel array PA, in a state where the pixel array PA is shaded. Alternatively, the readout circuit reads out black level reference signals from a shaded area SA in which pixels in the pixel array PA are shaded (shown with diagonal lines). The readout circuit also reads out pixel signals that depend on the light, from pixels in an effective area EA. The image sensor outputs the black level reference signals and the pixel signals from the pixel array PA to the subsequent stage. Then, at the subsequent stage, the pixel signals are corrected using the black level reference signals.

For example, one-dimensional projection data (projection data in a direction along a column) is derived from signals of a prescribed area AR2 selected according to the purpose, and a moving average is taken in a lateral direction (direction along a row) and set as dark shading correction data (see FIG. 8D) in order to remove the effect of the noise component. By performing a correction process of subtracting this dark shading correction data from the pixel signals (FIG. 8B), true image signals (see FIG. 8A) from which the effect of dark shading has been removed can be obtained. Here, the above-mentioned moving average means a signal processing that involves successively grouping the signals of a fixed number of pixels and deriving average values.

The readout circuit often performs, after performing a readout operation of reading out the pixel signals from a selected row in the pixel array, a transfer operation of sequentially transferring the pixel signals of the selected column to an output line. Image signals can be obtained by performing the dark shading correction process on signals output from the image sensor after they have undergone the readout operation and the transfer operation. However, the period for which this readout operation and transfer operation are performed, that is, the total readout period, tends to become longer as the number of pixels included in the pixel array increases.

With the technique of Japanese Patent Laid-Open No. 2001-045375, signals for driving pixels are supplied to the pixels by a plurality of row control lines each of which extends in a direction along a row, and the signals of the pixels are read out via a plurality of column signal lines each of which extends in a direction along a column, in a pixel array in which a plurality of pixels are arrayed two-dimensionally. Two storage units are connected to one end of the column signal lines, and when the signals of one of the two storage units are being transferred to the subsequent stage, signals read out from pixels are stored in the other of the two storage units. The blanking period (period of no sensor output) can thereby be reduced, and the total readout period can be shortened.

Here, the two storage units are assumed to be a first storage unit (capacitances 14 and 13 in Japanese Patent Laid-Open No. 2001-045375) and a second storage unit (capacitances 12 and 11 in Japanese Patent Laid-Open No. 2001-045375). In this case, the readout circuit, for the period that the pixel signals of a prescribed row (e.g., (n−1)th row) are being transferred from the second storage unit to an output line, turns on a readout switch in response to a driving pulse, and reads out the pixel signals of the next row to be read out (e.g., (n)th row) to the first storage unit. Note that n is an integer of 2 or more.

In this case, during the period that the signals of the (n−1)th row are transferred to the output lines, the power supply of the readout circuit and the voltage of the signal lines fluctuate due to the driving pulse for reading out the signals of the (n)th row to the first storage unit. Following this, the effect of the transition in the level of the driving pulse appears as noise in the transferred pixel signals of the (n−1)th row. Since this noise appears at a comparable level in the same column address in the pixel signals of each row that are transferred, it appears as linear noise in a vertical direction (=direction along a column) when viewed as an image.

Here, with conventional dark shading correction, correction is performed by storing a certain fixed value and by subtracting this fixed value from actually-captured image. However, when actually capturing an image of an object, since the brightness of the object is not known beforehand and therefore the brightness of the pixels to be corrected is not known beforehand, it is difficult to know the amount of noise to subtract from the actually-captured image beforehand. Thus, the possibility exists of not being able to sufficiently correct the noise simply by storing and subtracting a fixed value.

SUMMARY OF THE INVENTION

The present invention provides for improving the accuracy with which noise caused by a driving pulse for reading out pixel signals from a pixel array is corrected, while shortening a period for pixel signals to be read out from a pixel array and transferred to an output line.

An image sensing apparatus according to one aspect of the present invention is provided with a pixel array in which a plurality of pixels are arrayed in a direction along a row and in a direction along a column, and that includes a first row and a second row; a plurality of column signal lines that are connected to the pixel array; an output line; a readout unit that includes a plurality of first holding units and a plurality of second holding units, and that performs in parallel an operation of reading out pixel signals from the second row to the plurality of first holding units via the plurality of column signal lines, and an operation of sequentially transferring sequentially to the output line, pixel signals of columns in the first row that have been read out to the plurality of second holding units to the output line; a driving unit that, in a transferring period for the readout unit to transfer the pixel signals of the columns in the first row to the output line, supplies to the pixel array and/or the readout unit a driving pulse for reading out the pixel signals from the second row, in a transferring period for the readout unit to transfer the pixel signals of the columns in the first row to the output line; and a correction unit that corrects a pixel signal of a first column in the first row that was transferred by the readout unit at a timing at which a level of the driving pulse transitions in the transferring period, according to at least a level of a pixel signal of the first column in the second row.

According to the present invention, the accuracy with which noise caused by a driving pulse for reading out pixel signals from a pixel array is corrected can be improved, while shortening a period for pixel signals to be read out from a pixel array and transferred to an output line.

Further features of the present invention will become apparent from the following description of exemplary embodiments with reference to the attached drawings.

DESCRIPTION OF THE EMBODIMENTS

Problem to be Solved

Figure 10:
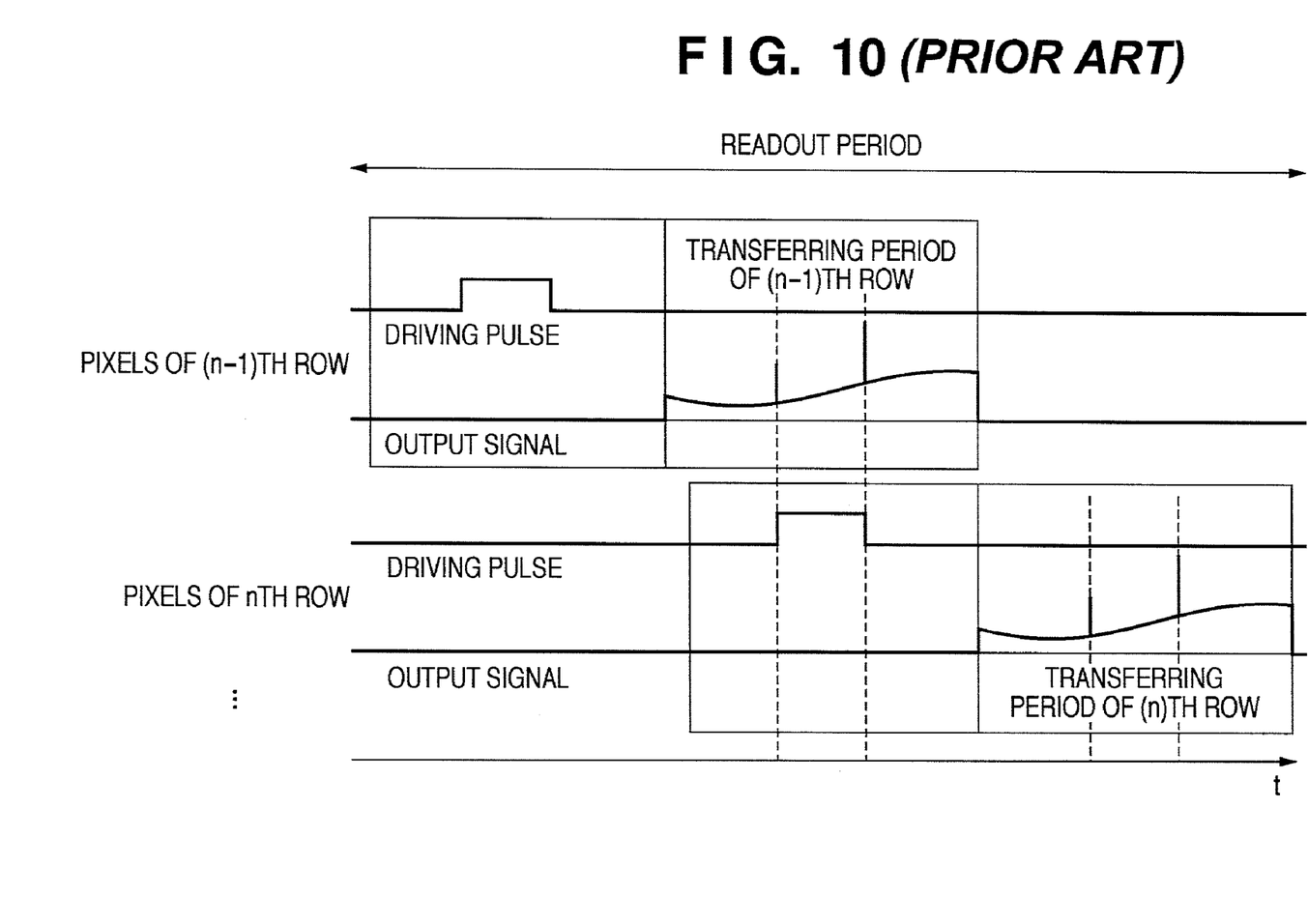
FIG. 10 is for illustrating a problem to be solved.

A problem that arises in executing an embodiment is described in detail using FIG. 10.

The present inventor made a circuit with a similar configuration to the circuit shown in Japanese Patent Laid-Open No. 2001-045375, and caused the circuit to perform an operation such that when the signals of one of two storage units were being transferred to an output line, signals output from pixels were read out to the other of the two storage units.

For example, as shown in FIG. 10, the readout circuit activated a driving pulse in a period in which the pixel signals of the (n−1)th row were being transferred from the second storage unit to the output line, in order to read out pixel signals from the next readout row (e.g., (n)th row) to the first storage unit. As a result, pulsed noise was mixed into the pixel signals of the (n−1)th row (output signals from the second storage unit) at the timing at which the level of the driving pulse transitioned.

The present inventor carried out further detailed investigations. As a result, it was found that the pulsed noise in the pixel signals of the (n−1)th row is dependent on the strength (level) of the pixel signals of the (n)th row that are read out as a result of the driving pulse. Specifically, the following was found.

This noise occurs as a result of voltage swing in the power supply or signal lines, following transfer of signals whose strengths differ depending on, for example, the brightness of the object or the exposure time. The noise occurs in response to the transition of the driving pulse for performing transfer of signals within pixels, or for reading out of signals whose strength differs depending on the object or shooting conditions, such as transfer signals that have passed though column signal lines, out of the driving pulses that are generated during the readout period.

Signals read out in response to the aforementioned pulse become stronger as the brightness of the object becomes higher. With this operation, the level fluctuation in the power supply and the signal lines becomes greater, and the amount of noise increases. Thus, the present inventor think that noise caused by the driving pulse can increase as the brightness of the object become higher. In addition, the present inventor think that, in the case of the same object, signals read out in response to the aforementioned pulse become stronger as an exposure time when shooting become longer or as the level fluctuation in the power supply and the signal lines becomes greater, and therefore the amount of noise increases. Thus, the present inventor think that noise caused by the driving pulse can increase as the exposure time become longer.

The brightness of an object to be captured varies depending on the object and the shooting environment, and signal strength differs depending on these factors. Further, since signal strength also differs depending on shooting conditions such as an exposure time, the possibility exists that, with the technique disclosed in Japanese Patent Laid-Open No. 2001-045375, there is a drop in the accuracy with which noise caused by a driving pulse is corrected.

<Configuration of Image Sensing Apparatus>

Figure 1:
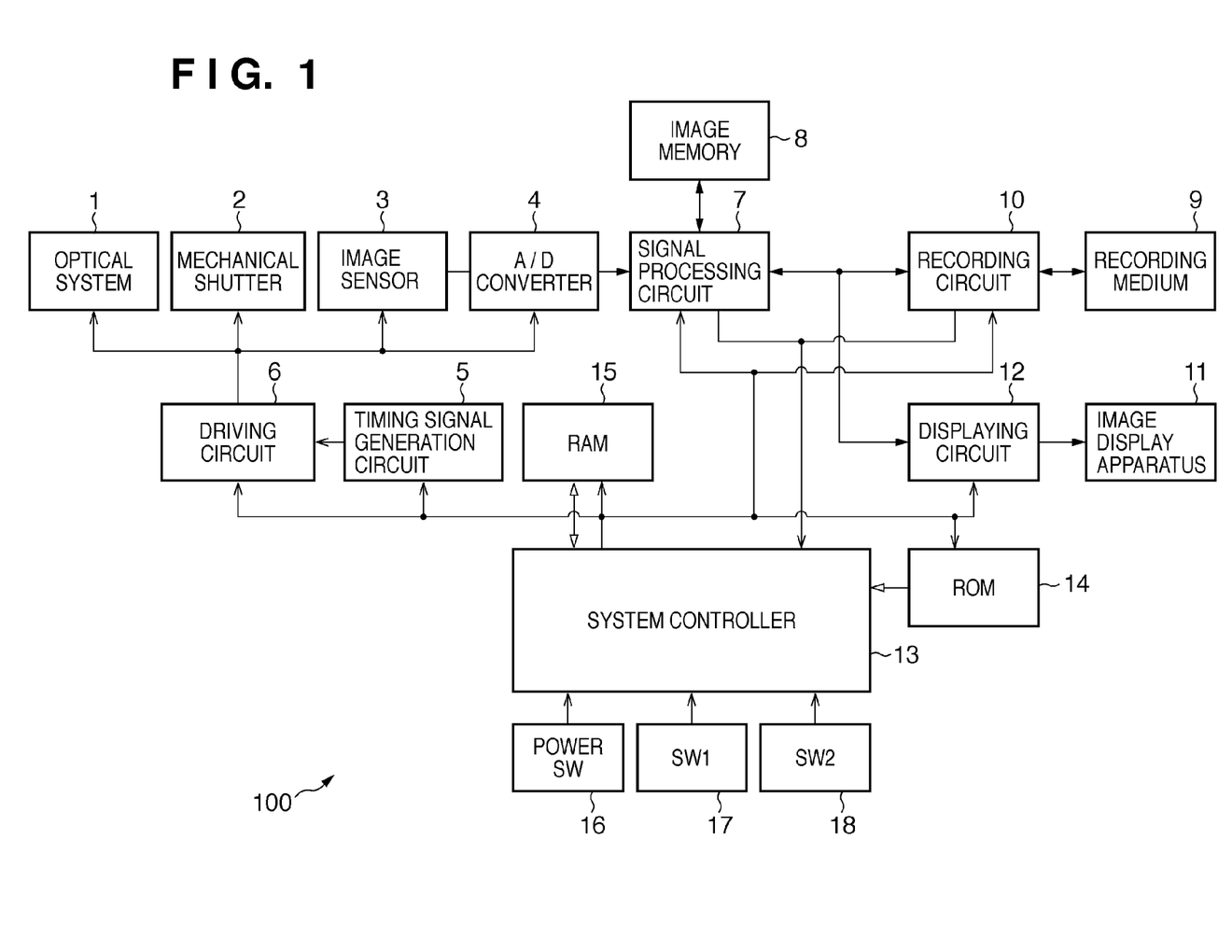
FIG. 1 is a diagram showing a configuration of an image sensing apparatus 100 according to an embodiment of the present invention.

The configuration of an image sensing apparatus 100 according to an embodiment of the present invention is described using FIG. 1.

The image sensing apparatus 100 is provided with the following constituent elements.

An optical system 1 forms an image of an object on an image sensing plane (pixel array) of an image sensor 3. The optical system 1 includes a lens and a stop.

A mechanical shutter 2 is provided on an optical path between the optical system 1 and the image sensor 3, and adjusts the exposure of the image sensor 3.

The image sensor 3 converts the image of the object formed on the pixel array to pixel signals. The image sensor 3 reads out these pixel signals from the pixel array and outputs the pixel signals. The detailed configuration and detailed operation of the image sensor 3 is described below.

An A/D converter 4 receives the pixel signals (analog signals) from the image sensor 3. The A/D converter 4 A/D- converts the pixel signals (analog signals) to generate image signals (digital signals), and outputs the generated image signals (digital signals) to a signal processing circuit 7.

A timing signal generation circuit 5 generates a timing signal, such as a reference clock signal, that forms a reference for operating the optical system 1, the image sensor 3, and the A/D converter 4. The timing signal generation circuit 5 supplies the generated timing signal to a driving circuit 6.

The driving circuit 6 receives the timing signal from the timing signal generation circuit 5. The driving circuit 6 respectively generates a driving pulse for the optical system, a driving pulse for the image sensor, and a driving pulse for the A/D converter, based on the timing signal. The driving circuit 6 drives the optical system 1, by supplying the optical system driving pulse to the optical system 1. The driving circuit 6 drives the image sensor 3, by supplying the image sensor driving pulse to the image sensor 3. The driving circuit 6 drives the A/D converter 4, by supplying the A/D converter driving pulse to the A/D converter 4.

A system controller 13 entirely controls each unit of the image sensing apparatus 100.

A power SW 16 receives a startup instruction for powering on the image sensing apparatus 100 from a user. The power SW 16 supplies the startup instruction to the system controller 13. The system controller 13 thereby causes power to be supplied to each unit of the image sensing apparatus 100.

The user turns on two switches (SW1, SW2) in stages by pressing a shutter switch (not shown).

A first switch (SW1) 17 is turned on when the shutter switch is pressed to a first stage. The way of pressing to the first stage includes, for example, pressing the shutter switch down halfway. The first SW 17 supplies a first instruction to the system controller 13. The system controller 13 performs operations such as an AF (Auto Focus) process, an AE (Auto Exposure) process, an AWB (Auto White Balance) process and an EF (Electronic Flash pre-emission) process, in response to the first instruction.

A second SW (SW2) 18 is turned on when the shutter switch is pressed to a second stage. The way of pressing to the second stage includes, for example, pressing the shutter switch down fully. The second SW 18 supplies a second instruction to the system controller 13. The system controller 13 performs a shooting operation in response to the second instruction. That is, the system controller 13 performs a series of processes that includes performing an exposure process and a developing process that involves calculation by the signal processing circuit 7, and performing a recording process of reading out image data from an image memory 8, performing compression, and writing image data to a recording medium 9. Note that the exposure process referred to here means a process of writing signals read out from the image sensor 3 to the image memory 8 via the A/D converter 4 and the signal processing circuit 7.

A nonvolatile memory (ROM) 14 stores programs describing control methods to be executed by the system controller 13, control data such as parameters and tables to be used when executing programs, and correction data such as defect addresses.

A volatile memory (RAM) 15 functions as a work area for the system controller 13, and temporarily stores programs, control data and correction data transferred from the nonvolatile memory 14.

The signal processing circuit 7 receives the image signals (digital signals) from the A/D converter 4. The signal processing circuit 7 generates image data, by performing prescribed signal processing (including a process of correcting noise caused by a driving pulse that depends on the brightness level of the object) on the image signals (digital signals). Note that the detailed operation of the signal processing circuit 7 is described below.

The signal processing circuit 7 supplies the generated image data to the image memory 8, a recording circuit 10, or a displaying circuit 12.

The image memory 8 functions as a work area for the signal processing circuit 7, and receives from the signal processing circuit 7 and temporarily stores image signals (digital signals) that are being processed by the signal processing circuit 7. The image memory 8 also functions as a buffer area for the signal processing circuit 7, and receives from the signal processing circuit 7 and temporarily stores image data generated by the signal processing circuit 7.

The recording circuit 10 receives image data from the signal processing circuit 7. The recording circuit 10 converts the received image data to data for recording, and records this data for recording to the recording medium 9. The recording medium 9 is detachably connected to the recording circuit 10.

The displaying circuit 12 receives image data from the signal processing circuit 7. The displaying circuit 12 converts the received image data to image signals for display (analog signals), and supplies these image signals for display to an image display apparatus 11.

The image display apparatus 11 receives the image signals for display from the displaying circuit 12. The image display apparatus 11 displays an image according to the image signals for display.

<Shooting Operation>

A shooting operation that uses the mechanical shutter 2 in the image sensing apparatus 100 is described.

The system controller 13 transfers and stores the necessary programs, control data and correction data from the nonvolatile memory 14 to the volatile memory 15 at an operation start, such as when the image sensing apparatus 100 is powered on, prior to the shooting operation.

These programs and data are used when the system controller 13 controls each unit of the image sensing apparatus 100. Also, the system controller 13 transfers additional programs and data from the nonvolatile memory 14 to the volatile memory 15 as required, or the system controller 13 directly reads out and uses data in the nonvolatile memory 14.

The driving circuit 6 drives the stop and lens in the optical system 1, as a result of a control signal from the system controller 13, such that an image of the object set at a suitable brightness is formed on the image sensing plane (pixel array) of the image sensor 3.

The driving circuit 6 drives the mechanical shutter 2, as a result of a control signal from the system controller 13, so as to shade the image sensor 3 in time with the operation of the image sensor 3 so as to achieve the required exposure time. Note that the driving circuit 6 may combine the mechanical shutter 2 and the electronic shutter function of the image sensor 3 to control the exposure of the image sensor 3.

The driving circuit 6 drives the image sensor 3, as a result of a control signal from the system controller 13, such that pixel signals (image signals) are read out from the pixel array PA.

Analog pixel signals output from the image sensor 3 are converted to digital image signals by the A/D converter 4, as a result of an operation pulse generated by the timing signal generation circuit 5, which is controlled by the system controller 13.

The signal processing circuit 7, which is controlled by the system controller 13, performs image processing, such as various types of correction including noise correction and dark shading correction, color conversion, white balance and gamma correction, a resolution conversion process, an image compression process and the like, on the digital image signals. The above noise correction includes a process of correcting noise caused by a driving pulse that depends on the brightness level of the object. The amount of noise caused by the driving pulse is pre-stored in the nonvolatile memory 14 or the like as coefficients that depend on the brightness level, and when shooting, the signal processing circuit 7 determines the brightness level of the object and executes correction. The pre-stored coefficients for correcting noise caused by a driving pulse and the method of correcting an image at the time of shooting is described in detail below.

The image memory 8 is used for temporarily storing digital image signals that are undergoing signal processing, and for storing image data that consists of digital image signals that have undergone signal processing.

Image data that has undergone signal processing in the signal processing circuit 7 and image data that is stored in the image memory 8 is converted in the recording circuit 10 to data suitable for the recording medium 9 (e.g., file system data having a hierarchical structure) and recorded in the recording medium 9.

Also, image data that has been converted to digital image signals by the A/D converter 4 is converted in the displaying circuit 12 to signals suitable for the image display apparatus 11 (e.g., NTSC analog signals, etc.), after undergoing a resolution conversion process in the signal processing circuit 7. These signals are then displayed on the image display apparatus 11.

Here, the signal processing circuit 7 may output digital image signals directly to the image memory 8 or the recording circuit 10 as image data, without performing signal processing as a result of a control signal from the system controller 13.

The signal processing circuit 7 also outputs information on digital image signals or image data that is generated in the signal processing process or information that has been extracted from digital image signals or image data to the system controller 13, in the case of there being a request from the system controller 13. Information on digital image signals or image data includes, for example, information such as the spatial frequency of an image, the average value of a specific area, and the data amount of a compressed image.

The recording circuit 10 outputs information on the type, free capacity and the like of the recording medium 9 to the system controller 13, in the case of there being a request from the system controller 13.

A playback operation in the case of there being image data recorded on the recording medium 9 is described. The recording circuit 10 reads out image data from the recording medium 9 as a result of a control signal from the system controller 13.

The signal processing circuit 7 performs an image decompression process and stores the image data in the image memory 8 as a result of a control signal from the system controller 13, in the case of the image data being a compressed image. The image data stored in the image memory 8 is converted in the displaying circuit 12 to signals suitable for the image display apparatus 11 and displayed on the image display apparatus 11, after undergoing a resolution conversion process in the signal processing circuit 7.

<Configuration of Image Sensor>

Figure 2:
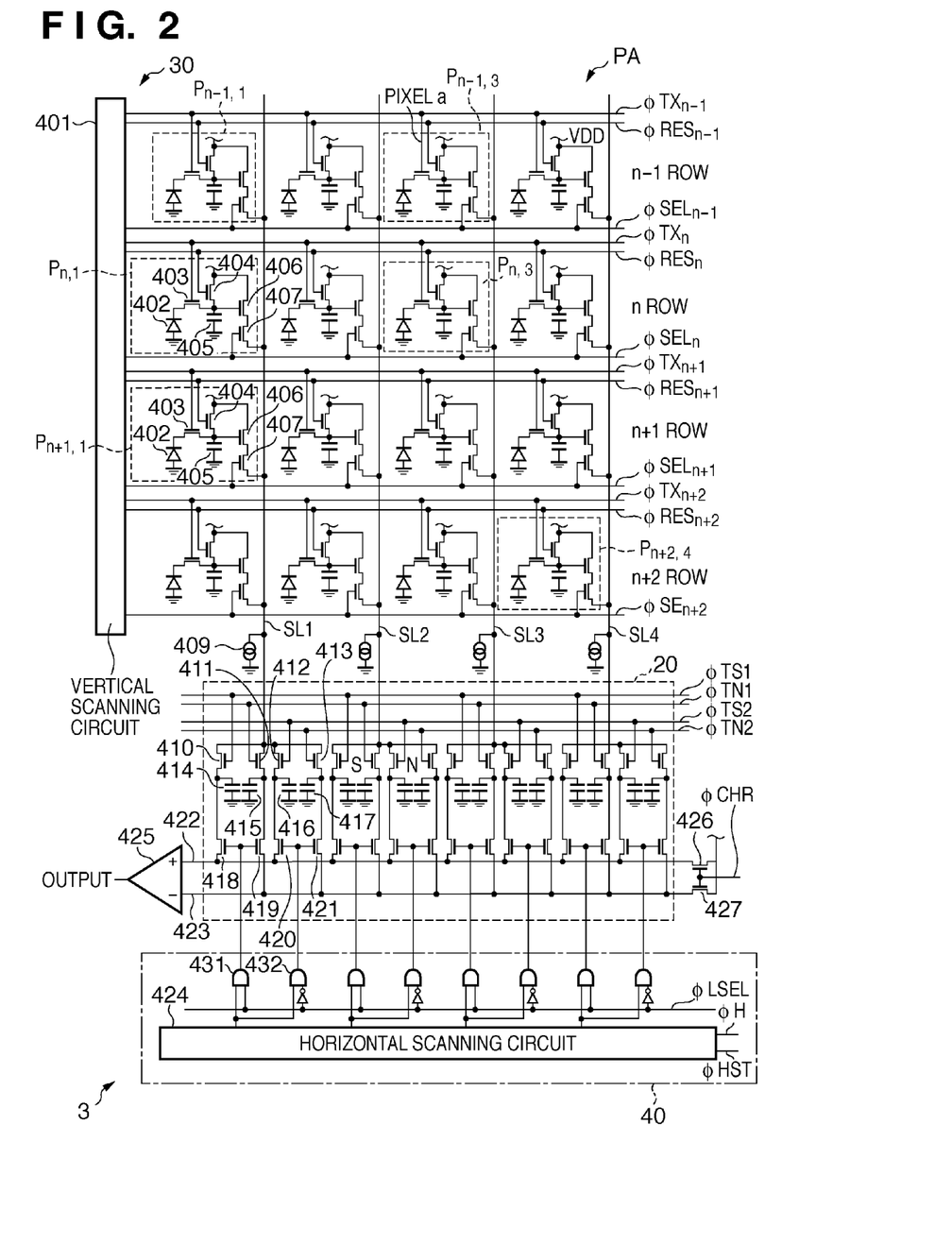
FIG. 2 is a diagram showing a configuration of an image sensor 3.

The detailed configuration of the image sensor 3 is described using FIG. 2.

The image sensor 3 includes a driving unit 30, a pixel array PA, a readout unit 20, a horizontal scanning unit 40, and an output amplifier 425.

The driving unit 30 includes a vertical scanning circuit 401. The vertical scanning circuit 401 scans the pixel array PA in a vertical direction (direction along a column). The vertical scanning circuit 401 selects a row in the pixel array PA, by supplying selection signals φSELn−1 to φSELn+2 to the pixels in rows, via selection control lines. The vertical scanning circuit 401 also drives a transferring operation of the pixels in selected row, by supplying transfer signals (one of φTXn−1 to φTXn+2) to the pixels in the row, via a transfer control line. The vertical scanning circuit 401 also drives a reset operation of the pixels in selected rows, by supplying reset signals φRESn−1 to φRESn+2 to the pixels in the rows, via reset control lines.

In the pixel array PA, a plurality of pixels Pn−1,1 to Pn+2,4 are arrayed in a direction along a row and a direction along a column. In FIG. 2, the case where the pixel array PA is configured by four rows and four columns of pixels is illustratively shown. Hereinafter, the configuration of the pixel Pn,1 is illustratively described.

Each pixel includes a photoelectric conversion unit 402, a transfer unit 403, a reset unit 404, a charge-voltage converter 405, an output unit 406, and a selection unit 407.

The photoelectric conversion unit 402 generates charges according to incident light, and accumulates the generated charges. The photoelectric conversion unit 402 is, for example, a photodiode.

The transfer unit 403 transfers the charges generated by the photoelectric conversion unit 402 to the charge-voltage converter 405. The transfer unit 403 is, for example, a transfer MOS transistor (transfer switch), and is turned on when an active level transfer signal φTXn is supplied from the vertical scanning circuit 401 to the gate, and thereby transfers the charges generated by the photoelectric conversion unit 402 to the charge-voltage converter 405.

The charge-voltage converter 405 converts the transferred charges to a voltage. The charge-voltage converter 405 is, for example, a floating diffusion having a parasitic capacitance.

The reset unit 404 resets the charge-voltage converter 405. Unnecessary charge stored in the charge-voltage converter 405 can thereby be swept out to the power supply. The reset unit 404 is, for example, a reset MOS transistor (reset switch), and is turned on when an active level reset signal φRESn is supplied from the vertical scanning circuit 401 to the gate, and thereby resets the charge-voltage converter 405.

The output unit 406 outputs a signal that depends on the voltage of the charge-voltage converter 405 to a column signal line SL1. The output unit 406 is, for example, an amplification MOS transistor (source follower amplifier), and outputs a signal corresponding to the voltage of the charge-voltage converter 405 to the column signal line SL1, by performing a source follower operation together with a load current source 409 that is connected to the column signal line SL1. The output unit 406 also constitutes a floating diffusion amplifier together with the charge-voltage converter 405.

The selection unit 407 sets each pixel to a selected/deselected state. The selection unit 407 is, for example, a selection MOS transistor (selection switch), and is turned on when an active level selection signal φSELn is supplied from the vertical scanning circuit 401 to the gate, and thereby sets the pixel Pn,1 to a selected state. The selection unit 407 makes the connection between the output unit 406 and the column signal line SL1, and causes the output unit 406 to output the signal to the column signal line SL1, when the pixel Pn,1 has been set to a selected state. The selection unit 407 is turned off when a non-active level selection signal φSELn is supplied from the vertical scanning circuit 401 to the gate, and thereby sets the pixel Pn,1 to a deselected state.

Note that the configurations of the other pixels Pn−1,1 to Pn−1,4 and Pn,2 to Pn+2,4 are similar to the configuration of the pixel Pn,1.

In the readout unit 20, readout switches 410 to 413, holding capacitances 414 to 417, and transfer switches 418 to 421 are repeatedly arrayed respectively in a direction along a row in correspondence with the columns in the pixel array PA.

The readout switches 410 to 413 open and close the connections between the column signal line (one of SL1 to SL4) and the holding capacitances 414 to 417, respectively.

The readout switches 410 are, for example, MOS transistors, and are turned on when an active level control signal ϕTS1 is supplied from the vertical scanning circuit 401 to the gate, and thereby cause S signals to be read out from the pixels to the holding capacitances 414 via the column signal lines SL1 to SL4. The readout switches 410 are turned off when a non-active level control signal ϕTS1 is supplied from the vertical scanning circuit 401 to the gate. The holding capacitances (first holding units) 414 thereby hold the pixel signals (S signals) of a single row (e.g., (n)th row) transferred via the column signal lines SL1 to SL4.

The readout switches 411 are, for example, MOS transistors, and are turned on when an active level control signal ϕTN1 is supplied from the vertical scanning circuit 401 to the gate, and thereby cause N signals to be read out from the pixels to the holding capacitances 415 via the column signal lines SL1 to SL4. The readout switches 411 are turned off when a non-active level control signal ϕTN1 is supplied from the vertical scanning circuit 401 to the gate. The holding capacitances (first holding units) 415 thereby hold the pixel signals (N signals) of a single row (e.g., (n)th row) transferred via the column signal lines SL1 to SL4.

The readout switches 412 are, for example, MOS transistors, and are turned on when an active level control signal ϕTS2 is supplied from the vertical scanning circuit 401 to the gate, and thereby cause S signals to be read out from the pixels to the holding capacitances 416 via the column signal lines SL1 to SL4. The readout switches 412 are turned off when a non-active level control signal ϕTS2 is supplied from the vertical scanning circuit 401 to the gate. The holding capacitances (second holding units) 416 thereby hold the pixel signals (S signals) of another single row (e.g., n−1 row) transferred via the column signal lines SL1 to SL4.

The readout switches 413 are, for example, MOS transistors, and are turned on when an active level control signal ϕTN2 is supplied from the vertical scanning circuit 401 to the gate, and thereby cause N signals to be read out from the pixels to the holding capacitances 417 via the column signal lines SL1 to SL4. The readout switches 413 are turned off when a non-active level control signal ϕTN2 is supplied from the vertical scanning circuit 401 to the gate. The holding capacitances (second holding units) 417 thereby hold the pixel signals (N signals) of another single row (e.g., (n−1)th row) transferred via the column signal lines SL1 to SL4.

The transfer switches 418 to 421 respectively connect/disconnect the holding capacitances 414 to 417 to/from output lines 422 and 423. The transfer switches 418 and 419 are turned on when an active level horizontal transfer signal is supplied from the horizontal scanning unit 40, and thereby output the S signals and the N signals held in the holding capacitances 414 and 415 to the output lines 422 and 423. The transfer switches 420 and 421 are turned on when an active level horizontal transfer signal is supplied from the horizontal scanning unit 40, and thereby output the S signals and the N signals held in the holding capacitances 416 and 417 to the output lines 422 and 423.

The horizontal scanning unit 40 includes gate logics 431 and 432 that are repeatedly arrayed in a direction along a row in correspondence with the columns in the pixel array PA, and a horizontal scanning circuit 424. The horizontal scanning circuit 424 sequentially supplies an active level signal to the gate logics 431 and 432 of the columns, in response to a horizontal scanning pulse ϕH and a start pulse ϕHST. One of the gate logics 431 and 432 is activated according to the level of a logic selection signal ϕLSEL. The gate logic 431, when activated, supplies an active level horizontal transfer signal to the transfer switches 418 and 419. The gate logic 432, when activated, supplies an active level horizontal transfer signal to the transfer switches 420 and 421.

The output amplifier 425 generates pixel signals (image signals) from which fixed pattern noise has been removed, by performing a CDS process of taking the differences between the S signals transferred via the output line 422 and the N signals transferred via the output line 423, and outputs the generated pixel signals to the A/D converter 4 (see FIG. 1).

Note that reset switches 426 and 427 reset the output lines 422 and 423, by being turned on when a control signal ϕCHR is at active level. Unnecessary charge in the output lines 422 and 423 is thereby swept out.

<Operation of Image Sensor>

The detailed operation of the image sensor 3 is described using FIGS. 3A to 3E. FIGS. 3A to 3E are timing charts showing the operation of the image sensor 3.

In a horizontal scanning period HTn−1 of times t1 to t9 (transferring period of (n−1)th row), the horizontal scanning circuit 424 of the horizontal scanning unit 40 sequentially supplies an active level signal to the gate logics 431 and 432 of the columns, in response to a horizontal scanning pulse ϕH and a start pulse ϕHST. Also, the driving circuit 6 (see FIG. 1) supplies a LOW level control signal ϕLSEL to the horizontal scanning unit 40. In the horizontal scanning unit 40, the gate logics 432 of the columns are sequentially activated. The S signals held in the holding capacitances 416 of the columns are thereby sequentially read out to the output line 422 via the transfer switches 420. At the same time, the N signals held in the holding capacitances 417 of the columns are sequentially transferred to the output line 423 via the transfer switches 421. These transferred pixel signals form the signals of the pixels of the (n−1)th row (first row). The output amplifier 425 generates difference signal between the S signals and N signals, and outputs the generated difference signal as pixel signal (image signals) to the A/D converter 4.

Meanwhile, at time t2, the driving unit 30 supplies an active level selection signal ϕSELn to the pixels Pn,1 to Pn,4 of the (n)th row to turn on the selection units 407 of the pixels Pn,1 to Pn,4 of the (n)th row and thereby sets the pixels to a selected state. At the same time, the driving unit 30 supplies an active level reset signal ϕRESn to the pixels Pn,1 to Pn,4 of the (n)th row to cause the reset units 404 of the pixels Pn,1 to Pn,4 of the (n)th row to reset the charge-voltage converters 405.

At time t3, the driving unit 30 supplies an non-active level reset signal ϕRESn to the pixels Pn,1 to Pn,4 of the (n)th row to complete the resetting of the charge-voltage converter 405. The driving unit 30 also supplies an active level control signal ϕTN1 to the readout switch 411 of each column. The readout switches 411 are thereby turned on, and pixel signals (N signals) are read out from the pixels of the (n)th row (second row) to the holding capacitances 415 via the column signal lines SL1 to SL4.

At time t4, the driving unit 30 supplies a non-active level control signal ϕTN1 to the readout switch 411 of each column. The readout switches 411 are thereby turned off, and the holding capacitances 415 hold the pixel signals (N signals).

Figures 3A, 3B:
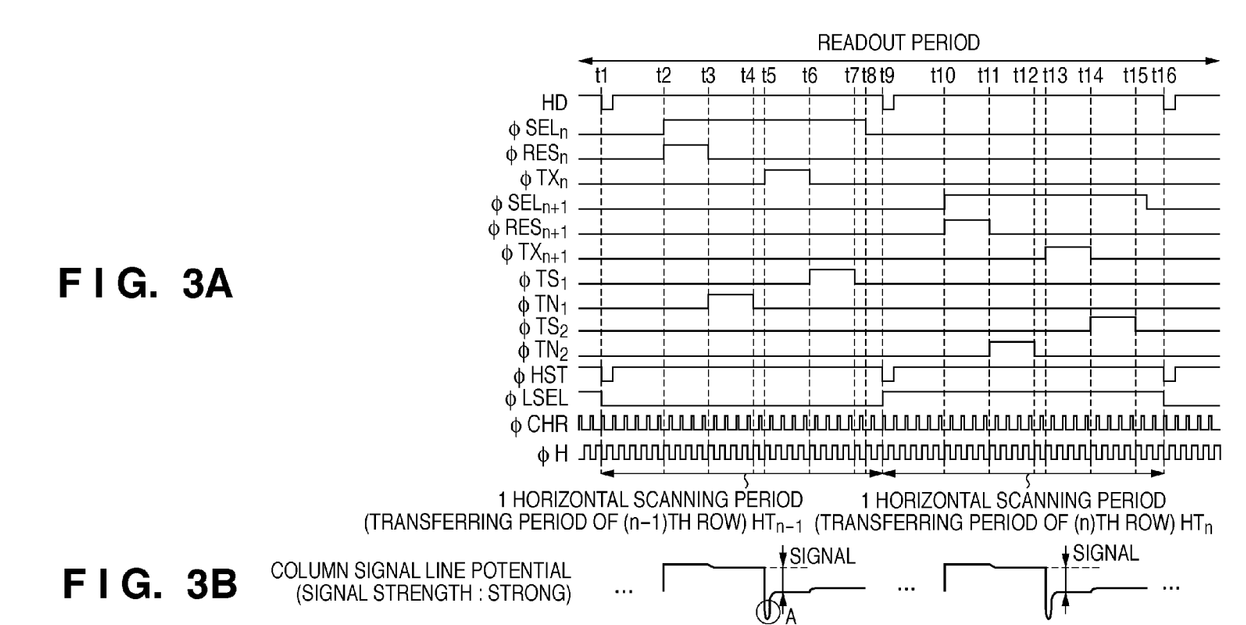
FIGS. 3A to 3E are timing charts showing the operation of the image sensor 3.

At time t5, the driving unit 30 supplies an active level transfer signal φTXn to the pixels Pn,1 to Pn,4 of the (n)th row to cause the transfer units 403 of the pixels Pn,1 to Pn,4 of the (n)th row to transfer the charge of the photoelectric conversion units 402 to the charge-voltage converters 405. At this time, the potential of the column signal lines SL1 to SL4 fluctuates greatly, as shown in FIG. 3B, since the driving pulse φTXn transits while the driving pulse φSELn are applied.

At time t6, the driving unit 30 supplies an active level control signal φTS1 to the readout switch 410 of each column. The readout switches 410 are thereby turned on, and the pixel signals (S signals) from the pixels of the (n)th row (second row) are read out to the holding capacitances 414.

At time t7, the driving unit 30 supplies a non-active level control signal φTS1 to the readout switch 410 of each column. The readout switches 410 are thereby turned off, and the holding capacitances 414 hold the pixel signals (S signals).

At time t8, the driving unit 30 supplies a non-active level selection signal φSELn to the pixels Pn,1 to Pn,4 of the (n)th row to turn off the selection units 407 of the pixels Pn,1 to Pn,4 of the (n)th row and thereby sets the pixels to a non-selected state.

The total readout period of the image sensor is thus shortened, by performing the operation of reading out the pixel signals of the (n)th row from pixels to the holding capacitances and the operation of transferring the pixel signals of the (n−1)th row from holding capacitances to the output lines, that is, a horizontal transferring operation, in parallel.

While the horizontal scanning period HTn of times t9 to t16 (transferring period of (n)th row) is essentially similar to the horizontal scanning period HTn−1 of times t1 to t9, an operation that differs from the horizontal scanning period HTn−1 in the following points is performed. The driving circuit 6 (see FIG. 1) supplies a HIGH level control signal φLSEL to the horizontal scanning unit 40. In the horizontal scanning unit 40, the gate logics 431 of the columns are sequentially activated. The S signals held in the holding capacitances 414 of the columns are thereby sequentially read out to the output line 422 via the transfer switches 418. At the same time, the N signals held in the holding capacitances 415 of the columns are sequentially transferred to the output line 423 via the transfer switches 419. These transferred pixel signals form the signals of the pixels of the (n)th row (first row).

On the other hand, at times t10 to t16, the operation of reading out pixel signals from pixels is similar to the operation at times t2 to t9.

<Noise Caused by Driving Pulse>

A noise caused by a transition in the level of a driving pulse is described in detail using FIGS. 3B to 3E.

Figure 3C:
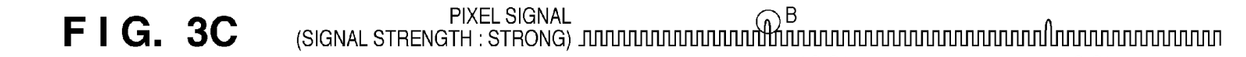
Figure 3D:
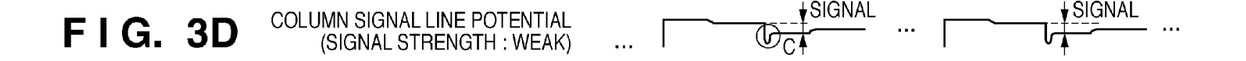

FIGS. 3B and 3D show the change in the potential of the column signal lines SL1 to SL4 when the charges of the photoelectric conversion units 402 are transferred to the charge-voltage converters 405 in the pixels Pn,1 to Pn,4 of the (n)th row in response to a driving pulse (φTXn). FIGS. 3B and 3D also show the change in the potential of column signal lines SL1 to SL4 when the charges of the photoelectric conversion units 402 are transferred to the charge-voltage converters 405 in the pixels Pn+1,1 to Pn+1,4 of the (n+1)th row in response to a driving pulse (φTXn+1).

More specifically, as shown in FIGS. 3A to 3E, signals that depend on the voltage of the charge-voltage converters are read out from the pixels of the (n)th row to the column signal lines, at a timing immediately after t5 at which charges starts being transferred from the photoelectric conversion units to the charge-voltage converters in the pixels of the (n)th row, and the voltage of the column signal lines drops. At this time, voltage swing occurs in the GND power supply of the readout circuit and the signal lines, due to the effect of current flow for charging the parasitic capacitance of the column signal lines. Following this, the effect of the transition in the level of the driving pulse manifests as noise in the pixel signals of the (n−1)th row that are transferred from the readout circuit to the subsequent stage. Similarly, signals that depend on the voltage of the charge-voltage converters are read out from the pixels of the (n+1)th row to the column signal lines, at a timing immediately after t13 at which charge starts being transferred from the photoelectric conversion units to the charge-voltage converters in the pixels of the (n+1)th row, and the voltage of the column signal lines drops. At this time, voltage swing occurs in the GND power supply of the readout circuit and the signal lines, due to the effect of current flow for charging the parasitic capacitance of the column signal lines. Following this, the effect of the transition in the level of the driving pulse appears as noises in the pixel signals of the (n)th row that are transferred from the readout circuit to the subsequent stage.

FIG. 3B shows the potential of the column signal lines in the case where the level of the pixel signals of the (n)th row read out from the pixels to the holding capacitances in the transferring period HTn−1 of the pixel signals of the (n−1)th row is large (a case where a signal strength is strong). FIG. 3B also shows the potential of the column signal lines in the case where the level of the pixel signals of the (n+1)th row read out from the pixels to the holding capacitances in the transferring period HTn of the pixel signals of the (n)th row is large (signal strength is strong). On the other hand, FIG. 3D shows the potential of the column signal lines in the case where the level of the pixel signals of the (n)th row read out from the pixels to the holding capacitances in the transferring period HTn−1 of the pixel signals of the (n−1)th row is small (signal strength is weak). FIG. 3D also shows the potential of the column signal lines in the case where the level of the pixel signals of the (n+1)th row read out from the pixels to the holding capacitances in the transferring period HTn of the pixel signals of the (n)th row is small (a case where a signal strength is weak).

A comparison of FIG. 3B and FIG. 3D reveals that the change in the potential of the column signal lines SL1 to SL4 at the transition timing (portions shown by A, C) also increases in response to an increase in the level of the pixel signals read out from the pixels. In other words, the change in the potential of the column signal lines SL1 to SL4 also increases in response to an increase in the brightness level of the object.

FIG. 3C shows the levels of the pixel signals of the (n−1)th row and the (n)th row output by the output amplifier 425, in the case where the signal amounts of the pixel signals of the (n)th row and the (n+1)th row are large (a case where a signal strength: strong).

Figure 3E:
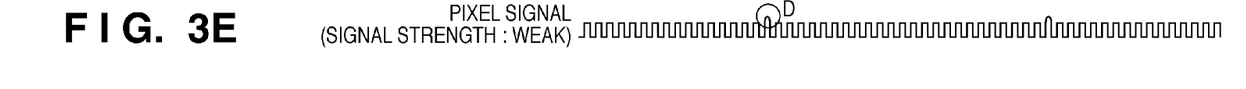

FIG. 3E shows the levels of the pixel signals of (n−1)th row and (n)th row output by the output amplifier 425, in the case where the signal amounts of the pixel signals of the (n)th row and the (n+1)th row are small (a case where a signal strength: weak).

A comparison of FIG. 3C and FIG. 3E reveals that the level of noise mixed into the pixel signals at the transition timing (shown by B, D) increases in response to an increase in the level of the pixel signals read out from the pixels.

As described above, this noise caused by the driving pulse that occurs during the transferring period occurs in the same column of each row, since the timing at which the driving pulse transitions corresponds to the same column address in the transferring period of the pixel signals in each row. This noise thereby appears in the image obtained from the pixel signals as vertical linear noise that is dependent on the strength of the signals, as shown by the relation between portion A of FIG. 3B and portion B of FIG. 3C, or the relation between portion C of FIG. 3D and portion D of FIG. 3E. The amount of this noise, being dependent on the strength of signals containing the brightness information of the object, differs from the amount of noise in a shaded state.

<Derivation of Correction Information for Correcting Noise Caused by Driving Pulse>

Figure 6:
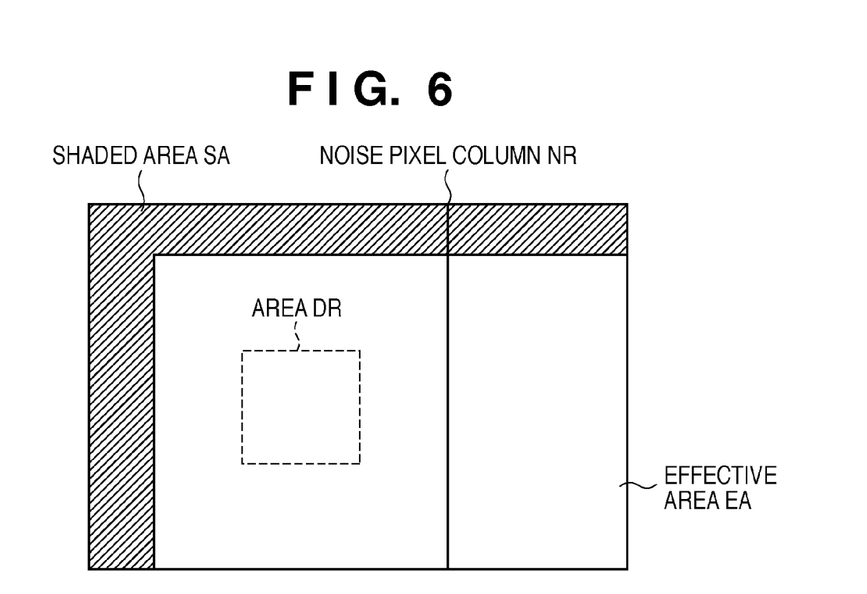
FIG. 6 shows an exemplary calculation area for deriving a correction coefficient.

In order to correct the above-mentioned noise caused by a driving pulse, correction information for correcting noise caused by a driving pulse needs to be stored prior to the actual shooting. Therefore, the correspondence relation between the level of pixel signals read out from pixels to the readout unit using a driving pulse and the level of noise that is included in the pixel signals transferred from the readout unit to an output line at the transition timing of the driving pulse (correction information) is acquired in advance and stored in the nonvolatile memory 14. A plurality of pieces of correction information are derived by shooting for a plurality of object brightness patterns, since this information is dependent on the level of pixel signals read out from pixels to the readout unit using the driving pulse. Here, as for measuring the above noise level, the noise level may be acquired before shooting, such as when the image sensing apparatus is powered on, or as a result of a shooting start instruction, for example, or may be stored in advance prior to the image sensing apparatus being shipped. Referring to FIG. 6, assume Sdr is an average value of output signals from the area DR when the area DR is exposed with light, Ndr is an average value of output signals from the area DR when the area DR is shielded from light, Snr is an average value of output signals from a noise pixel column NR when the noise pixel column NR is exposed with light, and Nnr is the horizontal shading output from the noise pixel column NR when the noise pixel column NR is shielded from light. Nnr is equivalent to "a" value obtained by summing an offset component "c" out of the vertical linear noise resulting from the effect of the driving pulse and a dark shading component "b2" of the corresponding pixel column. Taking (Sdr−Ndr) as the true image signal, the slope "a" of the straight line D (see FIG. 7) of an output signal (discussed below) can be derived from the relation between (Sdr−Ndr) and the difference between (Snr−Nnr) and (Sdr−Ndr) for various brightness levels, after having derived the difference between (Snr−Nnr) and (Sdr−Ndr) for a plurality of brightness patterns.

Figure 7:
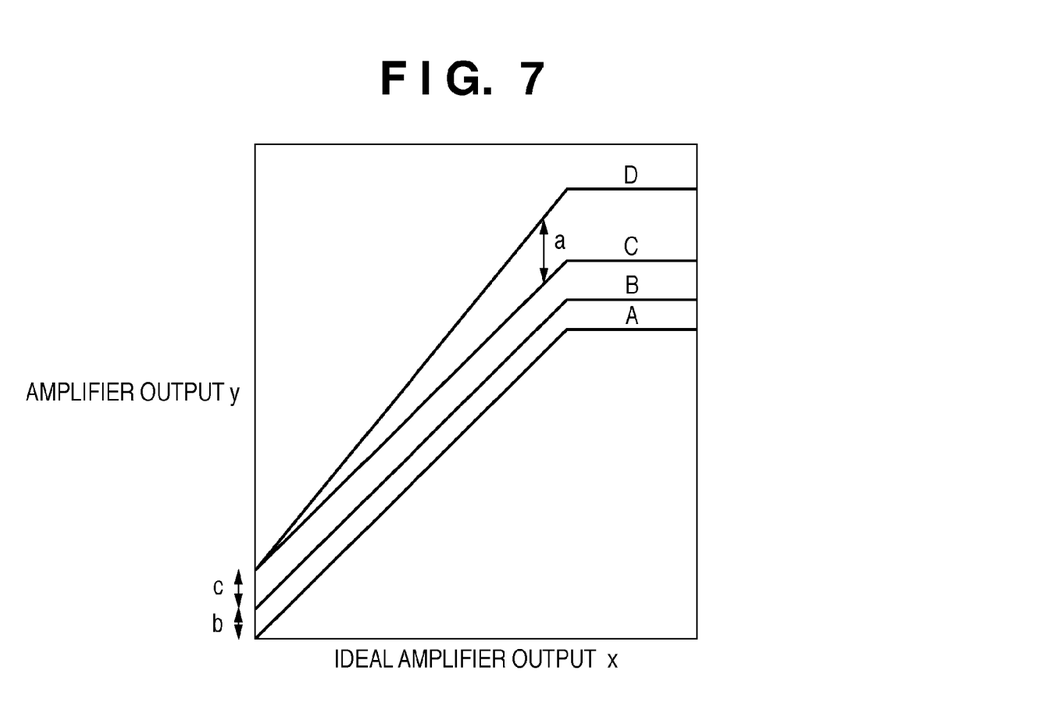
FIG. 7 shows a correspondence relation between the level of a pixel signal read out from the readout unit as a result of a driving pulse and the level of noise transferred downstream from the readout unit at a transmission timing of the driving pulse.

Taking the ideal amplifier output as being equal to the true image signal, the amplifier output of a pixel signal transferred at the transition timing of the driving pulse is like the straight line D in FIG. 7, where the x axis is the ideal amplifier output and the y axis is the detected level of the output amplifier 425. Also, the amplifier output of a pixel signal transferred at a timing other than the transition timing of the driving pulse is like the straight line B in FIG. 7. The straight lines A, B, C and D in FIG. 7 respectively correspond to the following:

A: ideal amplifier output
B: true image signal+dark shading (offset component)
C: true image signal+dark shading (offset component)+noise (offset component)
D: true image signal+dark shading (offset component)+noise (offset component+gain component)

Here, assume that "b" is the dark shading component, and "c" is the noise component (vertical linear noise due to the effect of the driving pulse). Also, with regard to the noise pixel column NR where noises depending on signal strength appear, "a" is the slope when signal strength is plotted on the horizontal axis and the amplifier output of the noise pixel column NR is plotted on the vertical axis.

The slope "a" of the noise pixel column NR at this time can be derived based on the output signals when a uniform brightness plane is shot (image signals transferred at the transition timing of the driving pulse, and image signals transferred at a timing other than the transition timing of the driving pulse). Similarly, the noise component "c" is also derived based on the output signals when a uniform brightness plane is shot (image signals transferred at the transition timing of the driving pulse, and image signals transferred at a timing other than the transition timing of the driving pulse). These coefficients "a" and "c" are derived for a plurality of object brightness patterns, and stored as a table (correction information).

<Method of Correcting Image at Time of Shooting>

The ideal amplifier output (straight line A in FIG. 7) can be represented as:

$$y = x \tag{1}$$

The output signal in the case where a dark shading component is added to the ideal amplifier output (straight line B in FIG. 7) is:

$$y1 = x + b1 \tag{2}$$

To derive the ideal amplifier output x, the following can be calculated:

$$x = y1 - b1 \tag{3}$$

That is, the ideal amplifier output x can be derived by subtracting the dark shading component "b1" from the output signal "y1" of the output amplifier 425. Note that the dark shading component "b1" is derived using signals output from the shaded area SA excluding the noise pixel column.

Further, the output signal in the case where noise is added in addition to dark shading (straight line D in FIG. 7) is:

$$y2 = a \cdot x + b2 + c \tag{4}$$

To derive the ideal amplifier output x, the following can be calculated:

$$x = \{y2 - (b2 + c)\}/a \tag{5}$$

That is, the ideal amplifier output "x" can be derived by summing a value obtained by multiplying the amplifier output "y2" of the pixel to be corrected by (1/a) and a value obtained by multiplying (b2+c) by (−1/a). Note that the dark shading component "b2" is derived using signals output from the noise pixel column NR in the shaded area SA.

Also, in the case where noise is not dependent on signal strength (straight line C in FIG. 7), a=1 and the output signal can be represented as:

$$y2 = x + b2 + c \tag{6}$$

The ideal amplifier output "x" can be derived by:

$$x = y2 - (b2 + c) \tag{7}$$

The detailed operation of the signal processing circuit 7 is described based on the above-described concepts.

When performing noise correction, a determination for selecting coefficients (determining coefficients) from the aforementioned coefficient table is performed. Either of FIGS. 5A to 5D, for example, is used as the area for the determination when correcting noise in the signal of a target pixel Pi,j. FIGS. 5A to 5D simply represent a state where pixel signals read out from the pixels of the image sensor are arrayed in the same way that the corresponding pixels are arranged.

Figure 5A:
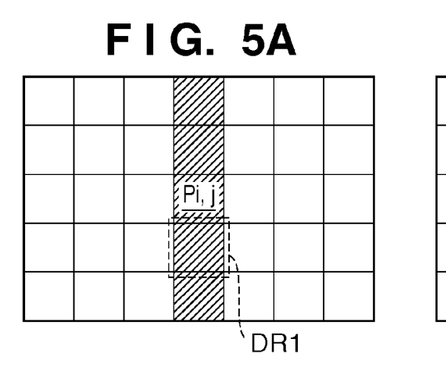
FIGS. 5A to 5D are for illustrating determination areas.
Figure 5B:
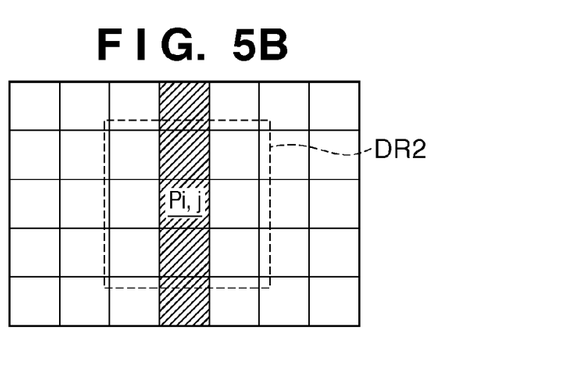
Figure 5C:
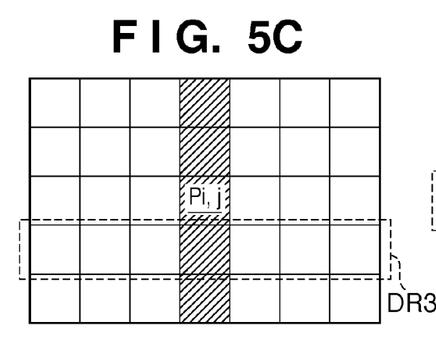

In the case of FIG. 5A, the pixel Pi+1,j arranged at the same address in the horizontal direction as the pixel Pi,j, out of the pixels arranged in the next row to the row in which the pixel Pi,j is arranged, is set as a determination area DR1 with respect to the signals of the pixel Pi,j stored in the holding capacitances 416 and 417 of FIG. 2. In correcting noise due to the effect of the driving pulse supplied when transferring pixel signals from the photoelectric conversion unit 402 to the charge-voltage converter 405 of FIG. 2, it is appropriate to determine the coefficients using the signal strength in the determination area DR1.

Note that in determining the coefficients, since there is considered to be hardly any difference in signal strength in the case of neighboring pixels, the signal strength of the pixel Pi,j itself can, for simplicity, be used as the determination area DR1.

When actually performing the determination, it is difficult to perform an accurate determination based on the value of one pixel due to noise which are different for each pixel. Thus, in order to remove the effect of the noise, it is preferable to use an integral value or an average value of signals in an area composed of a plurality of neighboring pixels. Note that there is no problem in performing the correction according to an average value of the output from peripheral pixels of substantially the same output level. Because, if a level of signal is large and a noise is sufficiently small relative to the signal, there is almost no difference in signal strength in the case of neighboring pixels.

Figure 5D:
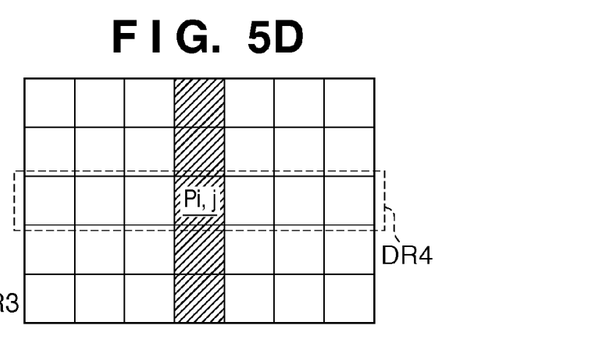

Exemplary pixel areas to be used in the determination include a determination area DR2 that includes the pixel Pi,j and a plurality of pixels peripheral to the pixel Pi,j (see FIG. 5B), a determination area DR3 that includes the row to be read out following the row in which the pixel Pi,j is arranged (see FIG. 5C), and a determination area DR4 that includes the row in which the pixel Pi,j is included (see FIG. 5D).

Figure 4:
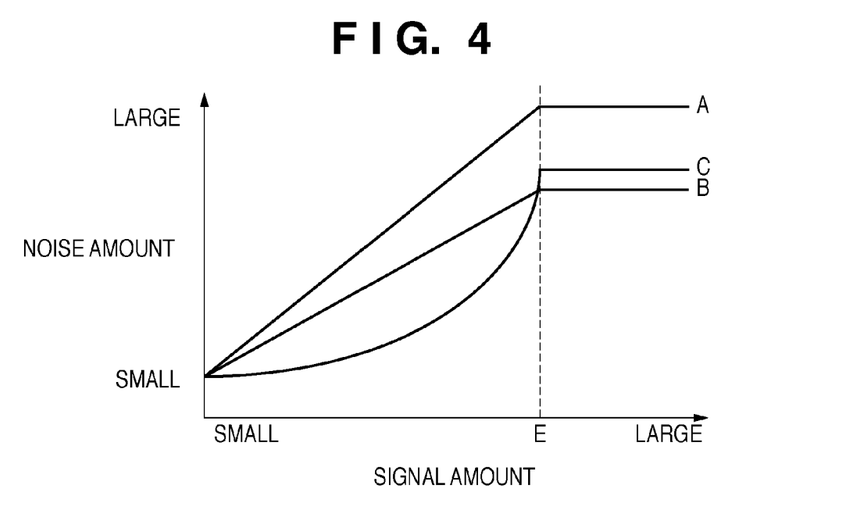
FIG. 4 shows an exemplary relation between the amount of a pixel signal read out using a driving pulse and the amount of noise in a pixel signal affected thereby (pixel signal transferred from a readout unit to the subsequent stage at a transition timing).

The signal processing circuit 7 (see FIG. 1) acquires information in the coefficient table (see FIG. 7) that corresponds to the levels of pixel signals obtained from one of the determination areas of FIGS. 5A to 5D (see FIG. 4), from the non-volatile memory 14. Then, the signal processing circuit 7, based on the coefficient table, corrects the pixel signals read out as a result of the driving pulse based on expression (7). In this way, the signal processing circuit 7 corrects the pixel signals of the column (first column) transferred by the readout unit 20 at the timing at which the level of the driving pulse transitions in the transferring period.

As described above, pulsed noise is mixed into these transferred pixel signals, following the operation of reading out pixel signals from pixels and the operation of transferring pixel signals from the readout unit 20 to the subsequent stage being performed in parallel in the image sensor 3. Even in this case, the signal processing circuit 7 corrects the pixel signals transferred downstream from the readout unit 20 at the timing at which the driving pulse transitions, according to the level of the pixel signals read out from the pixels as a result of this driving pulse. The accuracy with which noise caused by a transition in the level of a driving pulse is corrected can thereby be improved, even in the case where the readout period is shortened by performing the operation of reading out pixel signals from pixels to holding capacitances and the operation of transferring pixel signals from holding capacitances to output lines in parallel. That is, the accuracy with which noise caused by a transition in the level of a driving pulse for reading out signals from pixels is corrected can be improved, while shortening a period for reading out pixel signals from a pixel array and transferring the read signals to an output line.

Note that apart from the driving mode disclosed in the present embodiment, the present invention can be applied in the case where a pulse is generated during a horizontal transferring period of signals, and, as a result, noise occurs due to the effect of the driving of the pulse, and particularly in the case where driving is performed such that noise which is dependant on the signal amount occurs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-230198, filed Sep. 8, 2008, which is hereby incorporated by reference herein in its entirety.

What is claimed is:

1. An image sensing apparatus comprising:
a pixel array in which a plurality of pixels are arrayed in a direction along a row and in a direction along a column, and that includes a first row and a second row;
a plurality of column signal lines that are connected to the pixel array;
an output line;
a readout unit that includes a plurality of first holding units and a plurality of second holding units, and that performs in parallel an operation of reading out pixel signals from the second row to the plurality of first holding units via the plurality of column signal lines and an operation of sequentially transferring pixel signals of columns in the first row that have been read out to the plurality of second holding units to the output line;
a driving unit that, in a transferring period for the readout unit to transfer the pixel signals of the columns in the first row to the output line, supplies to the pixel array and/or the readout unit a driving pulse for reading out the pixel signals from the second row; and
a correction unit that corrects a pixel signal of a first column in the first row that was transferred by the readout unit at a timing at which a level of the driving pulse transitions in the transferring period, according to at least a level of a pixel signal of the first column in the second row.

2. The image sensing apparatus according to claim 1, wherein
each of the plurality of pixels includes:
a photoelectric conversion unit; and
an output unit that outputs a signal corresponding charges generated by the photoelectric conversion unit, and
the driving pulse includes a control signal for causing the signal to be output to a column signal line by the output unit in the pixel.

3. The image sensing apparatus according to claim 1, wherein
the readout unit further includes a plurality of switches that connects/disconnects the plurality of column signal lines to/from the plurality of first holding units, and
the driving pulse includes a control signal for causing pixel signals transferred by the plurality of column signal lines to be read out to the plurality of first holding units via the plurality of switches.

4. The image sensing apparatus according to claim 1, wherein
the correction unit corrects the pixel signal of the first column in the first row, according to a level of the pixel signal of the first column in the second row and a level of a pixel signal on the periphery of the pixel.

5. The image sensing apparatus according to claim 1, wherein the correction unit corrects the pixel signal of the first column in the first row, according to a level of the pixel signal of at least the first column in the first row.

6. The image sensing apparatus according to claim 1, wherein the correction unit corrects the pixel signal of the first column in the first row, according to a level of the pixel signal of at least the first column in the second row and a level of the pixel signal of at least the first column in the first row.

7. The image sensing apparatus according to claim 1, wherein the correction unit corrects the pixel signal of the first column in the first row, based on a pre-acquired correspondence relation between a level of the pixel signal of the first column in the second row and a level of noise included in the pixel signal of the first column in the first row.

* * * * *